Dec. 26, 1922.

W. A. SORG.
TRACTOR.
FILED NOV. 11, 1920.

1,439,920

INVENTOR
William A. Sorg,
Bradbury & Cornell
ATTORNEYS

Patented Dec. 26, 1922.

1,439,920

UNITED STATES PATENT OFFICE.

WILLIAM A. SORG, OF DENVER, COLORADO.

TRACTOR.

Application filed November 11, 1920. Serial No. 423,282.

*To all whom it may concern:*

Be it known that I, WILLIAM A. SORG, a citizen of the United States, residing at Denver, in the county of Denver and State of Colorado, have invented a new and useful Tractor, of which the following is a specification.

My invention relates to improvements in tractors, the primary object being to obtain traction and eliminate slippage in soft ground and twisting strains upon the bearings and driving members of the device. More particularly this invention is an improvement upon the construction set forth in Patent No. 1,062,422 granted to me on the 20th day of May, 1913. To these ends my invention comprises the features of construction and combination of parts hereinafter particularly described and defined by the appended claims.

Figure 2:
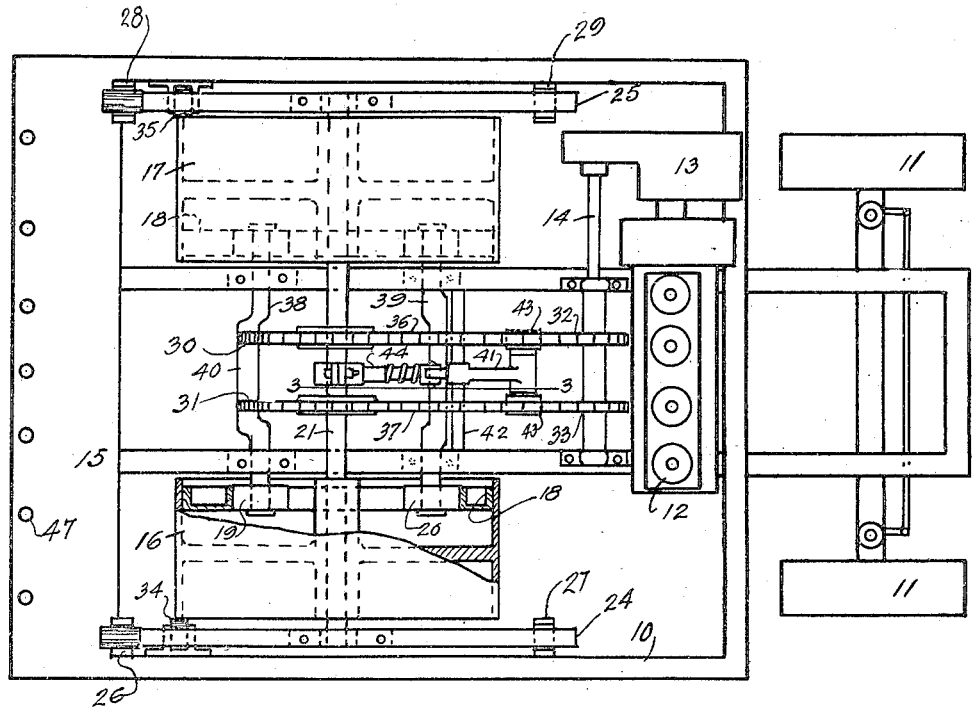
Figure 1:
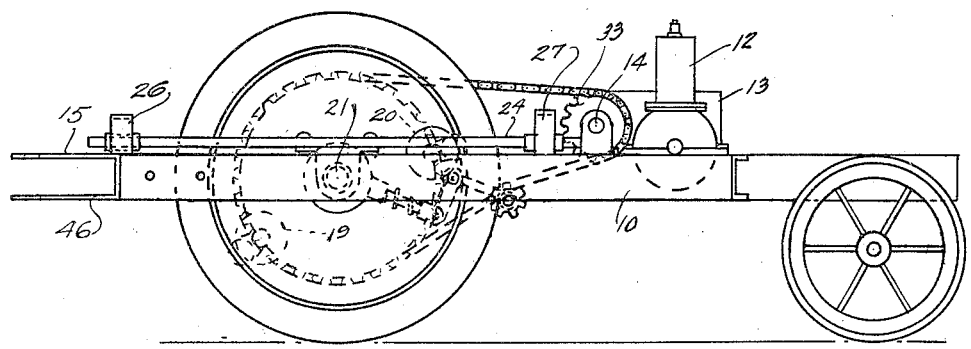
Figure 3:
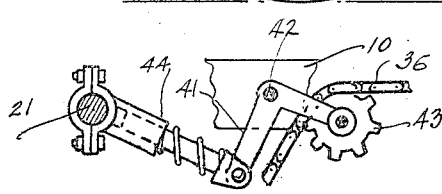

In the accompanying drawing forming part of this specification, Figure 1 is a side elevation of my invention; Fig. 2 is a plan of the structure shown in Fig. 1, and Fig. 3 is a section taken on the line 3—3 of Fig. 2 showing a detail of the slack take up.

In the drawing 10 indicates a body frame of channel steel or of any other suitable construction and material to constitute a mounting for the front steering wheels 11, engine 12, transmission 13, countershaft 14 and combined platform and draw-bar 15. The drive wheels 16 and 17, as shown, are equipped with a circular track 18 on the inside of the rim of each wheel and a pair of rollers 19 and 20 are adapted to come into contact with the track in each wheel as will hereinafter be described. The drive wheels 16 and 17 are mounted rigidly upon the wheel shaft 21, and revolve together but any suitable differential mechanism of usual construction may be employed. I have found the use of differential mechanism unnecessary, but for fast running or wide tread vehicles differential mechanism may be desirable and used within the scope of my invention.

A pair of longitudinal guide bars 24 and 25 are mounted on the opposite ends of the shaft 21 and are disposed near the opposite sides of the frame 10, being slidably mounted in guides 26, 27, 28 and 29 and adapted to move freely up and down and forwardly and backwardly. The guide bars, however, have limited movement in the guides so that sprockets 30 and 31 fixed to the drive shaft are kept in alignment with the drive sprockets 32 and 33 on the countershaft 14. Additional side guides in the form of anti-friction rollers 34 and 35, bearing against the side edges of the rims of the wheels and mounted on the frame, are adapted to assist in limiting side play and guide the wheels. The guides relieve wear and strain upon the fulcrums so that the fulcrums perform their function of fulcruming without guiding.

Chain belts 36 and 37 respectively passing around sprockets 30 and 32 and 31 and 33 serve to transmit power from the countershaft and engine 12 to the main tractor wheels 16 and 17, but it should be understood that any other suitable method of driving may be substituted for the chain drive.

The rollers 19 and 20 of each pair constitute respectively forward and backward anti-friction fulcrums for the traction wheel with which they are immediately associated and a line joining the axes of 19 and 20 is less than the diameter of the wheel so that sufficient slack space is provided in which the traction wheel may play freely. The rollers 19 and 20 are journaled freely on shafts 38 and 39, which are mounted rigidly on the frame 10 and formed with yokes 40 to freely escape the sprockets and chains. Thus, when power is applied to the sprockets 30 and 31 the pull on the chains is transferred to the top of said sprockets and the drive wheels will move forward bringing the tracks of the wheels in contact with the rollers 19. This action causes the frame to move forward, the weight of the frame 10, engine 12 and transmission thus resting upon rollers 19 and the rollers 20 being out of contact with the track wheel. The reverse action is produced when the counter-shaft is reversed, the pull of the chains being forward on the lower half of the sprockets 30 and 31, thereby shifting the wheels with their tracks fulcruming upon rollers 20 and causing the machine to move backwardly while the rollers 19 are out of contact with the track wheel. The wheel contact with the ground is substantially at a point on the vertical center line diametrically across the wheel so that it is evident there is a cam or eccentric action applying the power at the rim of the wheel at an angle downwardly instead of directly backwardly. This results in the prevention or reduction of slippage of the drive wheel in the ground. The rollers 19 and 20 act as anti-friction fulcrums, the roller 19 fulcruming the wheel during the forward driving movement and the roller 20 fulcruming the wheel during the backward movement. When either roller is performing the function of a fulcrum, the guides 24, 25, 34 and 35 are co-acting with the fulcrum to guide the wheel and prevent or eliminate twisting strains upon the bearings and driving members of the tractor.

Slack is taken up and the chain belts 36 and 37 held taut during the entire operation of the vehicle by means of the bell crank 41 which is pivoted at its angle portion on the shaft 42, the latter being mounted on the frame. The free end of the bell crank carries a pair of idle sprockets 43 which roll upwardly in mesh with and against the chain belts while its opposite end is tilted by a spring pressed connection 44 which is journaled on the drive shaft 21. Thus, an upward thrust movement under tension is imparted against the chain belts, which holds them tight at all times. The rear end of the frame, as shown, resembles a channel 46, one side of which is disposed horizontally across the frame and forms a platform upon which an operator may stand. Holes 47, downwardly through the sides of the channel, provide for assisting in securing a draw bar of any implement to be drawn to the tractor in any position desired.

In use, the fulcrum rollers traveling on the track rings within the traction wheels roll freely and are self cleaning, that is, any mud or dirt caught between the rollers and rings is pressed outwardly, thus cleaning the contacting surfaces.

My improvement thus provides the following advantages:

1st. The tractor wheels are pressed into firm contact with the ground under lever action, the harder the pull the firmer the engagement. Slippage is thus reduced to a minimum and the use of large lugs on the rims and consequent loss of power is obviated or reduced to a minimum.

2nd. The weight of the tractor is reduced to a minimum.

3rd. The tractor wheels are guided so that the fulcrums are left free to function without binding tendency. This relieves undue wear.

4th. The fulcrums running upon track rings are self cleaning.

5th. Power is more directly applied and greater flexibility of the tractor produced.

6th. Greater simplicity.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent is:

1. In a self propelled vehicle having a supporting frame, a freely disposed carrying wheel adapted at all times to carry the load and having its axis free from said frame, means for revolving said wheel, and a fulcrum between the wheel and frame disposed eccentrically to the wheel.

2. In a self propelled vehicle having a supporting frame, a freely disposed carrying wheel adapted at all times to carry the load and having its axis free from said frame, means carried by said frame for revolving said wheel, and a fulcrum on said frame upon which the wheel is adapted to turn on a pivot at a point disposed eccentrically to the wheel and in an angle between the axis and point of contact between the rim of the wheel and the ground whereby revolution of the wheel against said fulcrum tends to thrust the rim of the wheel down upon the ground and reduce tendency to slip.

3. In a self propelled vehicle having a supporting frame, a freely disposed carrying wheel adapted at all times to carry the load and having its axis free from said frame, means for revolving said wheel, and a fulcrum carried by said frame and resting within the rim and eccentric to said wheel.

4. In a self propelled vehicle having a supporting frame, a freely disposed carrying wheel adapted at all times to carry the load and having its axis free from said frame, means for revolving said wheel, and a fulcrum comprising an anti-friction roller journaled on said frame and in rolling contact with said wheel, said fulcrum being disposed eccentrically to the wheel.

5. In a self propelled vehicle having a supporting frame, a freely disposed carrying wheel adapted at all times to carry the load and having its axis free from said frame, means carried by said frame for revolving said wheel, and a fulcrum roller journaled on said frame and riding on the inner surface of an annular portion of said wheel eccentrically thereto.

6. In a self propelled vehicle having a supporting frame, a freely disposed carrying wheel having its axis free from said frame, means carried by said frame for revolving said wheel, and a pair of fulcrums, each comprising an anti-friction roller journaled on said frame, said rollers being revolubly mounted respectively in front and back of the axis and riding within the rim of the wheel, whereby revolution of the wheel in forward or backward direction against the fulcrums will cause the rim of the wheel to be pressed down under lever action against the surface of the ground to reduce slipping.

7. In a self propelled vehicle having a supporting frame, a freely disposed wheel having a track ring therein, the axis of said wheel being free from said frame and said wheel at all times carrying the load of said frame, means carried by said frame for revolving said wheel and an anti-friction roller constituting a fulcrum mounted on said frame and adapted to roll upon said ring at a changeable point, for the purposes specified.

8. In a self propelled vehicle having a supporting frame, a freely disposed wheel having a track ring therein, the axis of said wheel being free from said frame and said wheel at all times carrying the load of said frame, extensible means carried by said frame for revolving said wheel whereby the wheel may shift its position freely in the frame, and an anti-friction roller constituting a fulcrum on said frame and in rolling contact with said ring at a changeable point, for the purposes specified.

9. In a self propelled vehicle having a supporting frame, a freely disposed carrying wheel having a track ring therein, the axis of said wheel being free from said frame, extensible means carried by said frame for revolving said wheel whereby the wheel may shift its position freely in the frame, and a pair of anti-friction rollers constituting forward and backward fulcrums on said frame and in rolling contact with said ring to support the load of the frame on the wheel at changeable points of contact, said fulcrums being positioned on opposite sides of a vertical line passing through the center of the wheel.

10. In a self propelled vehicle, a supporting frame, a carrying wheel supporting load of the frame at all times and having its axis free from said frame, guiding means on said frame at the side of the wheel for limiting the side thrust of the wheel, means for revolving said wheel, and a fulcrum carried by the frame and riding upon the inner surface of the wheel below and at one side of the axis of the wheel.

11. In a self propelled vehicle, a supporting frame, a carrying wheel having its axis free from said frame, a guide bar journaled upon the axis of the wheel and having its ends slidably supported in said frame to limit side thrust of the wheel in the frame, means for revolving said wheel and a fulcrum carried by the frame and riding upon the inner surface of the wheel below and at one side of the axis of the wheel.

12. In a self propelled vehicle, a supporting frame, a carrying wheel having its axis free from said frame, a guide journaled upon the axis of the wheel and slidably supported in said frame to limit side thrust of the wheel in the frame, means for revolving said wheel, and a fulcrum carried by the frame and riding upon the inner surface of the wheel below and at one side of the axis of the wheel.

13. In a self propelled vehicle, a supporting frame, a pair of wheels carrying the load of the frame at all times and having a common axle free from said frame, means for movably guiding said axle in said frame to limit side thrust, means on said frame for driving said wheels, said driving means including an extensible driving connection to compensate for the up and down and longitudinal movement of the wheels in the frame, and a plurality of fulcrums carried by the frame and riding upon the inner surface of the wheels.

14. In a self propelled vehicle, a supporting frame, a pair of carrying wheels having a common axle free from said frame, means for movably guiding said axle in said frame to limit side thrust, a power unit on said frame, a chain belt drive between said power unit and said axle, a slack take up for said chain belt drive adapted to compensate for the up and down and longitudinal movement of said wheels in said frame, and pairs of forward and backward fulcrums carried by the frame and riding upon the inner surfaces of the wheels at the sides of the axis of the wheels.

15. In a self propelled vehicle, a supporting frame, a carrying wheel having its axis free from said frame whereby the frame constitutes a floating member, means for limiting the free play of said wheel up and down on said frame, a power unit on said frame, a chain belt drive between said power unit and the axis of the wheel, a spring pressed slack adjuster cooperating with the chain belt to hold the latter taut, and a pair of forward and backward anti-friction fulcrums on said frame disposed to roll on the inner surface of the wheel at the sides of the axis thereof.

16. In a self propelled vehicle, a supporting frame, a carrying wheel having its axis free from said frame whereby the frame constitutes a floating member, means for limiting the free play of said wheel up and down on said frame, a power unit on said frame, a chain belt drive between said power unit and the axis of the wheel, a spring pressed slack adjuster cooperating with the chain belt to hold the latter taut, and a pair of forward and backward anti-friction fulcrums on said frame disposed to roll at the sides of the axis thereof.

17. In a self propelled vehicle, a carrying traction wheel having an inner concentric track ring, a floating frame guided from lateral movement but free to ride freely up and down on said wheel, the axis of said wheel being entirely free from the frame, and a pair of forward and backward anti-friction fulcrums journaled on said frame and disposed in traveling connection with the wheel on said ring to carry the load of the frame, said fulcrums being disposed at the sides of the axis of the wheel.

18. In a self propelled vehicle, a carrying traction wheel having an inner concentric track ring, a floating frame free to ride up and down on said wheel independently of the wheel axis, a power element on said frame for driving said wheel, and a pair of forward and backward fulcrums on said frame disposed to travel on said ring at the sides of the axis of the wheel, the forward one of said fulcrums being adapted to make contact with the ring and wholly support the load of the frame when the tractor is moving in one direction and when the other fulcrum is out of contact and vice-versa, the other of said fulcrums being adapted to make contact with the ring and wholly support the load of the frame when the tractor is moving in the opposite direction and when the first mentioned fulcrum is out of contact with the ring.

19. In a self propelled vehicle, a carrying frame, a power plant on said frame, a traction wheel the axis of which is freely movable in said frame having an inner annular track surface, an antifriction roller journaled on said frame and disposed to revolve on said track surface and to constitute the sole support for the frame and its load at all times, the point of contact on the track being below and back of the axis of the wheel.

20. In a self propelled vehicle, a traction wheel having an inner annular track surface, a fulcrum roller disposed to roll upon said track surface below and back of the axis of said wheel, and a power element, the weight of which is carried by said fulcrum roller, said wheel being disposed to constitute the sole support for said frame and its load at all times.

21. In a self propelled vehicle, a traction wheel having an inner annular track surface, a pair of fulcrum rollers disposed to roll upon said track surface at the sides of the axis of said wheel, a frame upon which the fulcrums are journaled and for which the tractor wheel constitutes the sole support at all times, and a power element, the weight of which with said frame is carried by said fulcrum rollers.

22. In a self propelled vehicle, a frame, guiding wheels attached to the front end of the frame, a power element on said frame having a drive sprocket, a draw-bar connection and platform at the rear end of the frame, a traction wheel having its axis free from the frame, a driven sprocket wheel on the axis of the traction wheel and connected with the drive sprocket, said traction wheel being provided with an inner concentric track ring, forward and backward fulcrum rollers journaled on said frame and bearing on said ring at the sides of the axis of said traction wheel, and guiding means adapted to hold the driven sprocket in substantial alignment with the driving sprocket.

23. In a self propelled vehicle having a supporting frame and carrying wheels at the front portion thereof, a traction wheel having a contact element carried by the back portion of the frame, said wheels constituting the sole support at all times for said back portion of the frame, the contact by said contact element being with an inner annular track surface eccentric to the axis of the wheel and means for revolving said traction wheel whereby the engagement with the surface of the ground by the periphery of the drive wheel is automatically constant.

24. In a vehicle of the class set forth, a body frame, a revoluble traction wheel adapted to roll on the ground and constituting the sole support for said frame at all times, means for revolving said wheel and a fulcrum freely disposed between the frame and an eccentric portion of said wheel, the periphery of said wheel forming propelling engagement with the ground of a lever whose engagement with said frame by said wheel produces an increasing tendency to lift the load of the frame and thereby increase the force of said peripheral engagement between said wheel and ground automatically in proportion to the amount of work performed by the traction wheel.

25. In a self propelled vehicle having a supporting frame and guiding wheels, a pair of antifriction bearings on said frame, a traction wheel having free longitudinal movement regarding said frame and formed with an inner concentric surface adapted to support said bearings at opposite points eccentric to said wheel and means for revolving said wheel, said wheel being freely disposed longitudinally within fixed limits of travel.

26. In a self propelled vehicle having a supporting frame and guiding means, a pair of antifriction bearings on said frame, a traction wheel having free longitudinal movement with relation to said frame and formed with an inner concentric surface adapted to contact with said bearings at opposite points eccentric to said wheel, said wheel being freely disposed longitudinally within fixed limits of travel, means for revolving said wheel having a drive belt and a belt tightener cooperating with said belt and arranged so that as the frame moves back the belt is drawn taut automatically.

27. In combination with a tractor having a loosely disposed traction wheel and a frame for which said wheel constitutes a carrying element at all times and disposed to pull a load, a fulcrum arranged on the frame against which the wheel is adapted to press to transmit the resultant force of said pulling movement upon said load in a downward direction against the ground to reduce slipping.

28. In combination with a tractor having a loosely disposed traction wheel and a frame for which said wheel constitutes a carrying element at all times and disposed to pull a load, said wheel being permitted to move longitudinally in said frame, a fulcrum arranged on the frame against which the wheel is adapted to press to transmit the resultant force of said pulling effort and means for guiding said wheel longitudinally and limiting its lateral movement in said frame.

29. In combination with a tractor having a loosely disposed traction wheel and a frame for which said wheel constitutes a carrying element at all times and disposed to pull a load, said wheel being permitted to move longitudinally in said frame, a fulcrum arranged on said frame against which the wheel is adapted to press to transmit the resultant force of said pulling effort and means for guiding said wheel longitudinally in said frame.

30. In combination with a tractor having a loosely disposed traction wheel and a frame for which said wheel constitutes a carrying element at all times and disposed to pull a load, said wheel being permitted to move longitudinally in said frame, a fulcrum arranged on said frame against which the wheel is adapted to press to transmit the resultant force of said pulling effort and means for limiting the movement of said wheel laterally in said frame.

In testimony whereof, I have signed my name to this specification.

WILLIAM A. SORG.